(12) United States Patent
Kamikawa

(10) Patent No.: US 8,661,679 B2
(45) Date of Patent: Mar. 4, 2014

(54) BEARING DEVICE FOR VEHICLE AND METHOD OF MANUFACTURING THE SAME

(75) Inventor: Tsuyoshi Kamikawa, Nara (JP)

(73) Assignee: JTEKT Coporation, Osaka-Shi, Osaka (JP)

( * ) Notice: Subject to any disclaimer, the term of this patent is extended or adjusted under 35 U.S.C. 154(b) by 0 days.

(21) Appl. No.: 13/613,798

(22) Filed: Sep. 13, 2012

(65) Prior Publication Data

US 2013/0000124 A1  Jan. 3, 2013

Related U.S. Application Data

(62) Division of application No. 12/285,009, filed on Sep. 26, 2008, now abandoned.

(30) Foreign Application Priority Data

Sep. 27, 2007  (JP) .................................. 2007-251674

(51) Int. Cl.
   *B21D 53/26* (2006.01)

(52) U.S. Cl.
   USPC .......................... 29/894.36; 384/544; 384/625

(58) Field of Classification Search
   USPC ........ 29/894.36, 894.362; 384/625, 344, 537, 384/543, 569, 584–586, 544, 589
   See application file for complete search history.

(56) References Cited

U.S. PATENT DOCUMENTS

| | | | |
|---|---|---|---|
| 5,226,738 A * | 7/1993 | Valette et al. | 384/513 |
| 5,674,011 A | 10/1997 | Hofmann et al. | |
| 5,822,859 A * | 10/1998 | Kessen et al. | 29/898.061 |
| 5,984,422 A | 11/1999 | Seifert | |
| 6,299,360 B1 | 10/2001 | Dougherty et al. | |
| 6,371,268 B1 | 4/2002 | McMorris et al. | |
| 6,478,471 B2 | 11/2002 | Ishida et al. | |

(Continued)

FOREIGN PATENT DOCUMENTS

| | | |
|---|---|---|
| JP | 2000-234624 A | 8/2000 |
| JP | 2001-191714 A | 7/2001 |

(Continued)

OTHER PUBLICATIONS

Japanese Office Action dated Aug. 21, 2012 with Partial English-Language Translation.

(Continued)

*Primary Examiner* — David Bryant
*Assistant Examiner* — Ruth G Hidalgo-Hernandez
(74) *Attorney, Agent, or Firm* — McGinn IP Law Group, PLLC

(57) ABSTRACT

A method of manufacturing a bearing device for a wheel, the method including forming an inner shaft so that an outside diameter of the inner shaft at a first portion is smaller than an outside diameter of the inner shaft at a second portion which is adjacent to the first portion, the peripheral surface of the inner shaft at the first portion is to be heat-treated, and the peripheral surface of the inner shaft at the second portion is not to be heat-treated, and the first portion has a predetermined length in an axial direction, and heat-treating the peripheral surface of the inner shaft at the first portion, and finishing a peripheral surface of the inner shaft by lathe turning whereby a step is not formed at a border between the first portion and the second portion.

2 Claims, 3 Drawing Sheets

(56) References Cited

U.S. PATENT DOCUMENTS

| | | | |
|---|---|---|---|
| 6,523,909 B1 * | 2/2003 | Nakamura et al. | 301/105.1 |
| 6,880,898 B2 | 4/2005 | Nakamura et al. | |
| 6,928,737 B2 * | 8/2005 | Ishida et al. | 29/898.062 |
| 6,993,844 B2 * | 2/2006 | Toda et al. | 29/898.062 |
| 7,004,637 B1 | 2/2006 | Uyama et al. | |
| 7,047,645 B2 * | 5/2006 | Kaneko | 29/894.362 |
| 7,125,171 B2 | 10/2006 | Ouchi | |
| 7,147,381 B2 | 12/2006 | Ohtsuki | |
| 7,857,520 B2 | 12/2010 | Langer et al. | |
| 2007/0081752 A1 * | 4/2007 | Kametaka et al. | 384/544 |
| 2007/0122071 A1 | 5/2007 | Ohtsuki | |
| 2008/0310784 A1 | 12/2008 | Ohtsuki | |

FOREIGN PATENT DOCUMENTS

| | | |
|---|---|---|
| JP | 2001-191717 A | 7/2001 |
| JP | 2003-048405 A | 2/2003 |
| JP | 2004-278673 A | 10/2004 |
| JP | 2006-052816 A | 2/2006 |
| JP | 2006-062437 A | 3/2006 |
| JP | 2007-051748 A | 3/2007 |
| WO | WO 01/14756 A1 | 3/2001 |
| WO | 2003-507683 A | 2/2003 |
| WO | WO2006/059467 A1 | 6/2006 |

OTHER PUBLICATIONS

United States Office Action dated Jun. 26, 2012 in U.S. Appl. No. 12/285,009.
United States Office Action dated Jan. 12, 2012 in U.S. Appl. No. 12/285,009.
United States Office Action dated Oct. 17, 2011 in U.S. Appl. No. 12/285,009.
[JP,2001-191717, A]. Japan Patent Office/ http://dossier1.ipdl.inpit.go.jp/AIPN/odse_call_transl.idpl?N0000=7413&N0005=Ei7BzenZVBvfz7D1ZIK&N0120=01&N2001=2&N3001=2001191717&Ntt3=machineV14=industryV14&Ntt5=autoV14&Ntt6=&Ntt7=&Ntt8=Ntt9=&Ntt10=&Ntt11=&Ntt12=.
Japanese Decision of Refusal dated Jul. 2, 2013, with English translation.
Japanese Notification of Reason(s) for Refusal dated Aug. 20, 2013 with partial English translation.

* cited by examiner

FIG. 3

STEP 1

FORM INNER SHAFT SO THAT OUTSIDE DIAMETER OF INNER SHAFT AT FIRST PORTION IS SMALLER THAN OUTSIDE DIAMETER OF INNER SHAFT AT SECOND PORTION

STEP 2

HEAT-TREAT PERIPHERAL SURFACE OF INNER SHAFT AT FIRST PORTION

STEP 3

FINISH PERIPHERAL SURFACE OF INNER SHAFT BY LATHE TURNING

BEARING DEVICE FOR VEHICLE AND METHOD OF MANUFACTURING THE SAME

CROSS REFERENCE TO RELATED APPLICATIONS

The present application is a Divisional of U.S. patent application Ser. No. 12/285,009, filed on Sep. 26, 2008 now abandoned, which is based on Japanese Patent Application No. 2007-251674, filed on Sep. 27, 2007, the entire contents of which is incorporated herein by reference.

INCORPORATION BY REFERENCE

The disclosure of Japanese Patent Application No. 2007-251674 filed on Sep. 27, 2007 including the specification, drawings and abstract is incorporated herein by reference in its entirety.

BACKGROUND OF THE INVENTION

1. Field of the Invention

The invention relates to a bearing device for a wheel (hereinafter, may be simply referred to as "bearing device"), and a method of manufacturing the same. More specifically, the invention relates to a bearing device in which a wheel-mounting flange is formed on a peripheral surface of an inner shaft of an inner ring member, and an inner ring constituent member, which constitutes the inner ring member together with the inner shaft, is fitted to a periphery of the inner shaft, and a method of manufacturing the same.

2. Description of the Related Art

In a bearing device, heat treatment, such as induction hardening, is performed on a surface of a member, to increase surface hardness thereby improving abrasion resistance, and to reduce the possibility that fatigue failure may occur. For example, in a bearing device described in Japanese Patent Application Publication No. 2004-278673 (JP-A-2004-278673), the induction hardening is performed on a substantially entire peripheral surface of an inner shaft from a base of a wheel-mounting flange to an inner end portion in a vehicle-width direction. After performing the heat treatment on the peripheral surface of the inner shaft, abrasive finishing is generally performed on the peripheral surface of the inner shaft.

However, when the abrasive finishing is employed, the cost of installing an abrasive machine is high. This makes it difficult to reduce the cost of the product. In this regard, it is conceivable to finish the surface of the product by lathe turning. However, for example, when the inner shaft includes a spline portion, the peripheral surface of the inner shaft cannot be entirely heat-treated, because the spline portion may be strained due to the heat treatment if the peripheral surface of the inner shaft is entirely heat-treated; In this case, if a portion of the peripheral surface of the inner shaft is heat-treated, and the peripheral surface of the inner shaft is finished by lathe turning at a constant tip speed, a raw portion, which is a non-heat-treated portion, is cut by a larger amount than an amount by which the heat-treated portion is cut. Therefore, a step is formed at a border between the non-heat-treated portion and the heat-treated portion. This may make it difficult to fit a member to a periphery of the inner shaft at the non-heat-treated portion with a sufficient interference, and to firmly fix the member to the inner shaft. Also, a contact width between the member and the inner shaft (i.e., a length of a contact portion between the member and the inner shaft in an axial direction) may be short, and therefore, a creep may occur in the member.

SUMMARY OF THE INVENTION

The invention provides a bearing device that makes it possible to reduce the cost of installing finishing equipment, while ensuring a sufficient fitting force for fitting an inner ring constituent member to a periphery of an inner shaft, and a method of manufacturing the same.

A first aspect of the invention relates to a bearing device for a wheel. The bearing device includes: an inner ring member that includes an inner shaft and an inner ring constituent member fitted to a periphery of the inner shaft; an outer ring member that is disposed around a periphery of the inner ring member concentrically with the inner ring member; a rolling element that is rollably provided between the inner ring member and the outer ring member; a wheel-mounting flange that protrudes outward, and that is formed on a peripheral surface of the inner shaft at a position close to an outer end portion of the inner shaft in a vehicle-width direction; a bobbed portion that is a spline portion, and that is formed on the peripheral surface of the inner shaft at a position close to an inner end portion of the inner shaft in the vehicle-width direction; and a coupler ring which includes an inner peripheral spline portion that engages with the hobbed portion, and which is fitted to a periphery of the hobbed portion. A heat-treated portion of the peripheral surface of the inner shaft extends from an inner portion of a base of the wheel-mounting flange in the vehicle-width direction, to a position which is offset from an outer edge of the hobbed portion in the vehicle-width direction toward an outer side in the vehicle-width direction by a predetermined distance, and at which heat treatment does not influence the hobbed portion.

In the bearing device for a wheel according to the first aspect of the invention, the heat-treated portion of the peripheral surface of the inner shaft extends to the position at which heat treatment does not influence the hobbed portion formed on the peripheral surface of the inner shaft at the position close to the inner end portion in the vehicle-width direction. Thus, when finish turning, which makes it possible to reduce the cost of installing equipment, is employed to finish the peripheral surface of the inner shaft after heat treatment, such as induction hardening, is performed on the inner shaft, instead of abrasive finishing that is generally employed, the portion with a small diameter formed by finish turning is made as short as possible. The portion with a small diameter is a non-heat-treated portion. As described above, when the peripheral surface of the inner shaft is finished by lathe turning, the non-heat-treated portion is cut by a larger amount than an amount by which the heat-treated portion is cut. Therefore, the diameter of the inner shaft at the non-heat-treated portion becomes smaller than the diameter of the inner shaft at the heat-treated portion. Because the portion with a small diameter is made as short as possible, it is possible to ensure a sufficient contact width between the inner shaft and the inner ring constituent member fitted to an inner portion of the inner shaft in the vehicle-width direction. Thus, the inner ring constituent member is firmly fitted to the inner shaft. Also, it is possible to reduce the possibility that a creep may occur in the inner ring constituent member due to a short contact width.

The predetermined distance may be in a range of 3 to 10 mm. When the predetermined distance is in this range, it is possible to prevent the influence of the heat treatment on the hobbed portion. Further, the portion with a small diameter formed by finish turning is made as short as possible. This ensures a sufficient contact width between the inner shaft and the inner ring constituent member fitted to the inner portion of the inner shaft in the vehicle-width direction.

A second aspect of the invention relates to a bearing device for a wheel. The bearing device includes: an inner ring member that includes an inner shaft and an inner ring constituent member fitted to a periphery of the inner shaft; an outer ring member that is disposed around a periphery of the inner ring member concentrically with the inner ring member; a rolling element that is rollably provided between the inner ring member and the outer ring member; and a wheel-mounting flange that protrudes outward, and that is formed on a peripheral surface of the inner shaft at a position close to an outer end portion of the inner shaft in a vehicle-width direction. A heat-treated portion of the peripheral surface of the inner shaft extends from an inner portion of a base of the wheel-mounting flange in the vehicle-width direction toward an inner end portion of the inner shaft in the vehicle-width direction, and the heat-treated portion has a predetermined length in an axial direction. An outside diameter of the inner shaft at the heat-treated portion is smaller than the outside diameter of the inner shaft at a non-heat-treated portion.

In the bearing device for a wheel according to the second aspect of the invention, the inner ring constituent member is fitted to the peripheral surface of the inner shaft, and the outside diameter of the inner shaft at the heat-treated portion is set to be smaller than the outside diameter of the inner shaft at the non-heat-treated portion. Thus, when the finish turning, which makes it possible to reduce the cost of installing equipment, is employed to finish the peripheral surface of the inner shaft after the heat treatment, such as the induction hardening, is performed on the inner shaft, instead of the abrasive finishing that is generally employed, and accordingly, the outside diameter of the inner shaft at the non-heat-treated portion becomes slightly smaller than a set value due to a tolerance in the finish turning process, a step is not formed between the heat-treated portion and the non-heat-treated portion, because the outside diameter of the inner shaft at the raw portion, which is the non-heat-treated portion, is set to be larger than the outside diameter of the inner shaft at the heat-treated portion.

In the bearing device according to the second aspect of the invention, a stress that exceeds a predetermined value may be concentrated on the heat-treated portion with the predetermined length, when the bearing device is used. Further, the material of the inner shaft may be carbon steel for machine structural use; and the predetermined value may be 240 MPa.

With this configuration, the heat-treated portion is limited to the minimum portion that needs to be heat-treated. That is, the heat-treated portion is limited to the portion on which a stress that exceeds the predetermined value is concentrated. When the inner shaft is made of carbon steel for machine structural use, the heat-treated portion is limited to the portion on which a stress that exceeds 240 MPa is concentrated. Therefore, the contact width between the inner shaft and the inner ring constituent member fitted to the heat-treated portion at a position close to the base of the wheel-mounting flange is hardly reduced. Thus, it is possible to ensure a sufficient fitting force for fitting the inner ring constituent member to the inner shaft. Also, there is no possibility that a creep may occur in the inner ring constituent member. Further, it is possible to finish the outer surface of the inner shaft by lathe turning. Thus, it is possible to reduce the cost of installing the finishing equipment. Accordingly, it is possible to reduce the cost of the product.

Further, a difference between the outside diameter of the inner shaft at the non-heat-treated portion and the outside diameter of the inner shaft at the heat-treated portion may be in a range of 0.2 to 0.4 mm. If the difference in the outside diameter is set to be in this range, a step is not formed when the peripheral surface of the inner shaft is finished by lathe turning. Therefore, it is possible to ensure sufficient axial strength against a bending moment.

A third aspect of the invention relates to a bearing device for a wheel. The bearing device includes: an inner ring member that includes an inner shaft and an inner ring constituent member fitted to a periphery of the inner shaft; an outer ring member that is disposed around a periphery of the inner ring member concentrically with the inner ring member; a rolling element that is rollably provided between the inner ring member and the outer ring member; and a wheel-mounting flange that protrudes outward, and that is formed on a peripheral surface of the inner shaft at a position close to an outer end portion of the inner shaft in a vehicle-width direction. A heat-treated portion of the peripheral surface of the inner shaft extends from an inner portion of a base of the wheel-mounting flange in the vehicle-width direction toward an inner end portion of the inner shaft in the vehicle-width direction, and the heat-treated portion has a first predetermined length in an axial direction. An outside diameter of the inner shaft at the heat-treated portion and the outside diameter of the inner shaft at a boundary portion of a non-heat-treated portion, which is adjacent to the heat-treated portion, are smaller than the outside diameter of the inner shaft at the non-heat-treated portion excluding the boundary portion, and the boundary portion has a second predetermined length in the axial direction.

In the bearing device for a wheel according to the third aspect of the invention, the outside diameter of the inner shaft at the heat-treated portion, and the outside diameter of the inner shaft at the boundary portion of the non-heat-treated portion, which is adjacent to the heat-treated portion, are smaller than the outside diameter of the inner shaft at the non-heat-treated portion excluding the boundary portion. The boundary portion has the second predetermined length in the axial direction. Thus, it is possible to avoid the situation where a step is formed at a border between the heat-treated portion and the non-heat-treated portion when the peripheral surface of the inner shaft is machined by lathe turning.

In the bearing device according to the third aspect of the invention, a stress that exceeds a predetermined value may be concentrated on the heat-treated portion with the first predetermined length, when the bearing device is used. Further, the material of the inner shaft may be carbon steel for machine structural use; and the predetermined value may be 240 MPa.

A difference between the outside diameter of the inner shaft at the non-heat-treated portion excluding the boundary portion and the outside diameter of the inner shaft at the heat-treated portion may be in a range of 0.2 to 0.4 mm. When the difference in the outside diameter is set to be in this range, a step is not formed when the peripheral surface of the inner shaft is finished by lathe turning. Therefore, it is possible to ensure sufficient axial strength against a bending moment.

The bearing device for a wheel according to the invention makes it possible to reduce the cost of installing equipment for finishing the peripheral surface of the inner shaft, while ensuring a sufficient fitting force for fitting the inner ring constituent member to the periphery of the inner shaft.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a flowchart showing steps of a method of manufacturing the bearing device according to the embodiment of the invention.

DETAILED DESCRIPTION OF EMBODIMENTS

Figure 1:
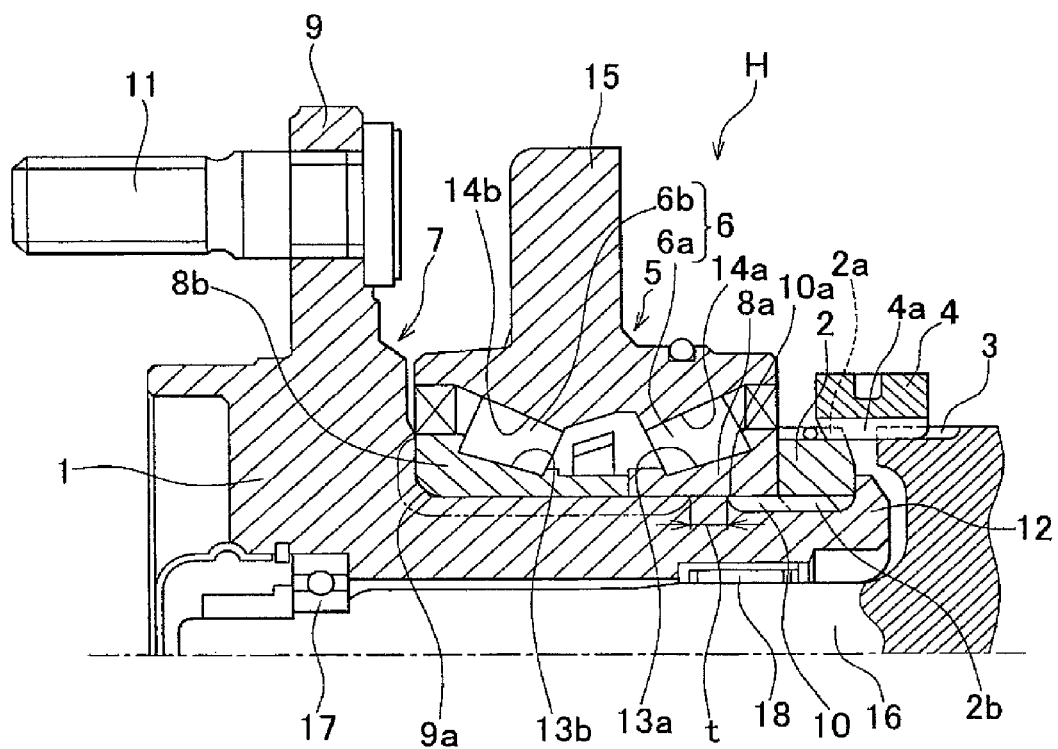
FIG. 1 is a sectional view illustrating a wheel support device that includes a bearing device according to an embodiment of the invention.

Hereinafter, a bearing device for a wheel (hereinafter, may be simply referred to as "bearing device") according to an embodiment of the invention will be described in detail with reference to the drawings. FIG. 1 is a sectional view illustrating a wheel support device that includes a bearing device H according to the embodiment of the invention.

The wheel support device is used, for example, in a part-time four wheel drive vehicle in which a drive mode is switchable between a two wheel drive mode and a four wheel drive mode. The bearing device H includes an outer ring member 5 and an inner ring member 7. The outer ring member 5 is fixed to a vehicle body. The inner ring member 7 is disposed concentrically with the outer ring member 5 in a manner such that the inner ring member 7 is rotatable around an axis. Rolling elements (tapered rollers) 6 in double rows are provided between the outer ring member 5 and the inner ring member 7. The inner ring member 7 includes an inner shaft 1 with a substantially cylindrical shape, and a pair of inner ring constituent members 8 fitted to a periphery of the inner shaft 1. A wheel-mounting flange 9, which protrudes outward, is formed on a peripheral surface of the inner shaft 1 at a position close to an outer end portion of the inner shaft in a vehicle-width direction (i.e., an end portion located in the left side of FIG. 1). A wheel (not shown) of a wheel assembly (not shown) is fastened to the wheel-mounting flange 9 using a bolt 11. A hobbed portion 10 is formed on the peripheral surface of the inner shaft 1 at a position close to the other end portion in an axial direction (i.e., an inner end portion in the vehicle-width direction). The hobbed portion 10 is a spline portion for transmitting a driving force to the inner shaft 1. A calking portion 12 is formed by plastically-deforming the other end portion of the inner shaft 1 in the axial direction. The calking portion 12 is located on the inner side of the hobbed portion 10 in the vehicle-width direction.

The inner ring constituent members 8 include a first inner ring constituent member 8a and a second inner ring constituent member 8b that are separate from each other. The first inner ring constituent member 8a includes a first inner ring raceway 13a, and the second inner ring constituent member 8b includes a second inner ring raceway 13b. The first inner ring raceway 13a is a raceway surface for tapered rollers 6a in the first row. The second inner ring raceway 13b is a raceway surface for tapered rollers 6b in the second row. The outer ring member 5 includes a first outer ring raceway 14a and a second outer ring raceway 14b. The first outer ring raceway 14a is located opposite to the first inner ring raceway 13a, and the second outer ring raceway 14b is located opposite to the second inner ring raceway 13b. A flange portion 15, which extends outward in a radial direction, is formed on a peripheral surface of the outer ring member 5. The flange portion 15 is attached to a suspension (not shown) for a vehicle body.

A ball bearing 17 and a needle roller bearing 18 are provided between the inner shaft 1 and an axle 16. The inner shaft 1 is rotatably supported with respect to the axle 16 by the ball bearing 17 and the needle roller bearing 18. The ball bearing 17 is a deep groove ball bearing. The ball bearing 17 is disposed at substantially the same position as the position at which the wheel-mounting flange 9 of the inner shaft 1 is located in the axial direction. The needle roller bearing 18 is disposed on the inner side of the ball bearing 17 in the vehicle-width direction. The axial position of the needle roller bearing 18 is substantially the same as the axial position of the first inner ring constituent member 8a provided on the peripheral surface of the inner shaft 1. Because the two bearings 17 and 18 are provided, the inner shaft 1 is firmly supported with respect to the axle 16, while the inner shaft 1 and the axle 16 are disposed coaxially with each other. This increases rigidity of the wheel support device. Also, because the needle roller bearing 18 is used as the bearing on the inner side in the vehicle-width direction, a portion of the inner shaft 1, to which the bearing 18 is fitted, is easily made sufficiently thick.

A coupler ring 2, which is a ring-shaped member, is provided between the first inner ring constituent member 8a and the calking portion 12 of the inner shaft 1. The coupler ring 2 is provided to contact an inner end surface of the first inner ring constituent member 8a in the vehicle-width direction. An inner peripheral spline portion 2b is formed on an inner peripheral surface of the coupler ring 2, and a peripheral spline portion 2a is formed on a peripheral surface of the coupler ring 2. The inner peripheral spline portion 2b engages with the hobbed portion 10 of the inner shaft 1. That is the coupler ring 2 is fitted to a periphery of the hobbed portion 10.

An axle-side spline portion 3 is formed on a peripheral surface of the axle 16 at a position close to the coupler ring 2. The axle-side spline portion 3 has the same diameter and the same shape as those of the peripheral spline portion 2a of the coupler ring 2. The peripheral spline portion 2a and the axle-side spline portion 3 are positioned coaxially with each other. An inner peripheral spline portion 4a of a gear ring 4 engages with the axle-side spline portion 3. The gear ring 4 is slidable in the axial direction. When the gear ring 4 moves toward an outer side in the vehicle-width direction, the gear ring 4 engages with both of the axle-side spline portion 3 and the peripheral spline portion 2a (this state is shown in FIG. 1). Thus, the driving force is transmitted from the axle 16 to the inner shaft 1. When the gear ring 4 moves toward an inner side in the vehicle-width direction, the gear ring 4 engages with the axle-side spline portion 3, but the gear ring 4 disengages from the peripheral spline portion 2a (this state is not shown). Thus, it is possible to allow and interrupt the transmission of the driving force to the inner shaft 1, by sliding the gear ring 4 in the axial direction. Although not shown in FIG. 1, the gear ring 4 is slid by a slide mechanism that uses appropriate power means, such as air and hydraulic pressure.

When the bearing device H is used, a stress is concentrated on a portion at and around a base of the wheel-mounting flange 9 of the inner shaft 1. Therefore, a crack or breakage is likely to occur in the portion at and around the base of the wheel-mounting flange 9. Thus, this portion is generally heat-treated to increase surface hardness.

According to the first aspect of the invention, the heat-treated portion is extended as much as possible toward the inner end portion of the inner shaft 1 in the vehicle-width direction. More specifically, the heat-treated portion of the peripheral surface of the inner shaft 1 extends from an inner portion 9a of the base of the wheel-mounting flange 9 in the vehicle-width direction, to a position which is offset from an outer edge 10a of the hobbed portion 10 in the vehicle-width direction toward the outer side in the vehicle-width direction by a predetermined distance t, and at which heat treatment does not influence the hobbed portion 10. In FIG. 1, the heat-treated portion is shown by a two-dot chain line.

The heat-treated portion of the peripheral surface of the inner shaft 1 is extended as much as possible toward an inner side in the vehicle-width direction, within a range where the heat treatment does not influence the hobbed portion 10. Thus, when the peripheral surface of the inner shaft 1 is finished after the heat treatment, such as the induction hardening, is performed on the inner shaft 1, it is possible to employ the finish turning, instead of the abrasive finishing that is generally employed. When the peripheral surface of the inner shaft 1 is finished by lathe turning, a raw portion, which is the non-heat-treated portion, is cut by a larger amount than an amount by which the heat-treated portion is cut, as described above. As a result, the diameter of the inner shaft 1 at the non-heat-treated portion becomes smaller than the diameter of the inner shaft 1 at the heat-treated portion. However, because the heat-treated portion is extended as much as possible toward the inner side in the vehicle-width direction, the portion with a small diameter is made short. As a result, it is possible to ensure a sufficient contact width between the inner shaft 1 and the first inner ring constituent member 8a fitted to the inner portion of the inner shaft 1 in the vehicle-width direction. Thus, the first inner ring constituent member 8a is firmly fitted to the inner shaft 1. Also, it is possible to reduce the possibility that a creep may occur in the first inner ring constituent member 8a due to a short contact width.

The predetermined distance t varies according to, for example, the size of the bearing device, the method of the heat treatment, and the time during which the heat treatment is performed. That is, the predetermined distance t is not limited to a specific distance in the invention. However, the predetermined distance t is generally 3 to 10 mm. The predetermined distance t may be approximately 3 to 4 mm. When the predetermined distance t is in this range, it is possible to prevent the influence of the heat treatment on the hobbed portion 10. Further, the portion with a small diameter formed by finish turning is made as short as possible. This ensures a sufficient contact width between the inner shaft 1 and the first inner ring constituent member 8a fitted to the inner portion of the inner shaft 1 in the vehicle-width direction.

According to the second aspect of the invention, the outside diameter of the inner shaft 1 at the heat-treated portion is smaller than the outside diameter of the inner shaft 1 at the non-heat-treated portion. Also, the heat-treated portion is limited to the minimum portion that needs to be heat-treated. That is, when the outside diameter of the inner shaft 1 at the heat-treated portion and the outside diameter of the inner shaft 1 at the non-heat-treated portion are set to the same value, and the peripheral surface of the inner shaft 1 is finished by lathe turning, a step is formed at a border between the heat-treated portion and the non-heat-treated portion, as described above. In contrast, when the outside diameter of the inner shaft 1 at the heat-treated portion is set to be smaller than the outside diameter of the inner shaft 1 at the non-heat-treated portion, and the finish turning is employed instead of the abrasive finishing that is generally employed, a step is not formed at the border between the heat-treated portion and the non-heat-treated portion, because the outside diameter of the inner shaft 1 at the non-heat-treated portion becomes slightly smaller than the set value due to a tolerance in the finish turning process.

Figure 2:
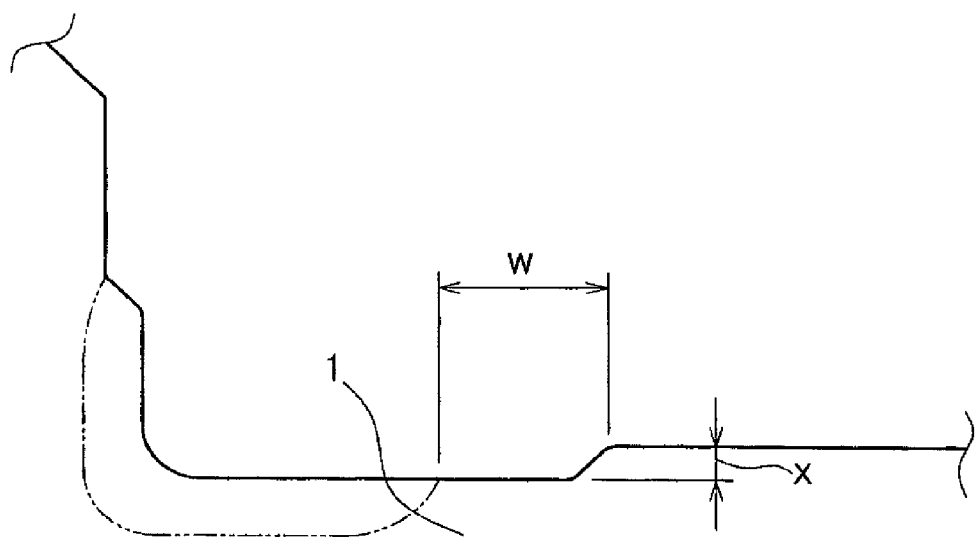
FIG. 2 is a view illustrating a portion at and around a base of a wheel-mounting flange of an inner shaft.

According to the third aspect of the invention, as schematically shown in FIG. 2, the outside diameter of the inner shaft 1 at the heat-treated portion (in FIG. 2, the heat-treated portion is shown by the two-dot chain line), and the outside diameter of the inner shaft 1 at a boundary portion of the non-heat-treated portion, which is adjacent to the heat-treated portion, are smaller than the outside diameter of the inner shaft 1 at the non-heat-treated portion excluding the boundary portion. The boundary portion has a predetermined width W (i.e., a predetermined length W in the axial direction of the inner shaft 1). Although the boundary portion is not directly heat-treated, the boundary portion is influenced by the heat treatment. Because the outside diameter of the inner shaft 1 at the boundary portion is made small as well as the outside diameter of the inner shaft 1 at the heat-treated portion, it is possible to avoid the situation where a step is formed at the border between the heat-treated portion and the non-heat-treated portion when the peripheral surface of the inner shaft 1 is machined by lathe turning. The predetermined width W varies according to, for example, the type of the heat treatment and the time during which the heat treatment is performed. However, the predetermined width W is generally approximately 3 to 4 mm.

A difference X between the outside diameter of the inner shaft 1 at the non-heat-treated portion excluding the boundary portion and the outside diameter of the inner shaft 1 at the heat-treated portion varies according to, for example, a material of the inner shaft 1 and a tolerance in the lathe turning process. However, the difference X is generally in a range of 0.2 to 0.4 mm (a difference between an outside radius of the inner shaft 1 at the heat-treated portion and an outside radius of the inner shaft 1 at the non-heat-treated portion is in a range of 0.1 to 0.2 mm). When the difference X in the outside diameter is set to be in this range, a step is not formed when the peripheral surface of the inner shaft 1 is finished by lathe turning. Therefore, it is possible to ensure sufficient axial strength against a bending moment.

According to the second to third aspects of the invention, the heat-treated portion of the peripheral surface of the inner shaft 1 is limited to the minimum portion that needs to be heat-treated. More specifically, when the inner shaft 1 is made of carbon steel for machine structural use, the heat-treated portion is limited to the portion of the inner shaft 1, on which a stress exceeding 240 MPa is concentrated. The value of 240 MPa is set taking into account a stress limit of the material constituting the inner shaft 1, above which fatigue failure occurs. In a portion where a stress that is below 240 MPa is applied, a defect, such as a crack, does not occur even when the portion is not heat-treated. Thus, according to the second to third aspects of the invention, the heat-treated portion is limited to the minimum portion that needs to be heat-treated. Therefore, the contact width between the inner shaft 1 and the second inner ring constituent member 8b fitted to the heat-treated portion at a position close to the base of the wheel-mounting flange 9 is hardly reduced. Thus, it is possible to ensure a sufficient fitting force for fitting the second inner ring constituent member 8b to the inner shaft 1. Also, there is no possibility that a creep may occur in the second inner ring constituent member 8b.

According to the second to third aspects of the invention, the heat-treated portion is limited, and the outside diameter of the inner shaft 1 at the heat-treated portion is set to be smaller than the outside diameter of the inner shaft 1 at the non-heat-treated portion. Therefore, it is possible to finish the outer peripheral surface of the inner shaft 1 by lathe turning. Thus, it is possible to reduce the cost of installing finishing equipment. Accordingly, it is possible to reduce the cost of the product.

Next, a method of manufacturing the bearing device H will be described with reference to FIG. 3. FIG. 3 is a flowchart showing steps of the method of manufacturing the bearing device H. In step 1, the inner shaft 1 is formed so that the outside diameter of the inner shaft 1 at a first portion is smaller than the outside diameter of the inner shaft 1 at a second portion. The peripheral surface of the inner shaft 1 at the first portion is to be heat-treated, and the peripheral surface of the inner shaft 1 at the second portion is not to be heat-treated. The first portion extends from the inner portion of the base of the wheel-mounting flange 9 in the vehicle-width direction toward the inner end portion of the inner shaft 1 in the vehicle-width direction, and the first portion has a first predetermined length in the axial direction. A stress that exceeds a predetermined value is concentrated on the first portion with the first predetermined length, when the bearing device H is used. When the inner shaft 1 is made of carbon steel for machine structural use, a stress that exceeds 240 MPa is concentrated on the first portion when the bearing device is used. A difference between the outside diameter of the inner shaft 1 at the first portion and the outside diameter of the inner shaft 1 at the second portion is generally in a range of 0.2 to 0.4 mm.

The inner shaft 1 may be formed so that the outside diameter of the inner shaft 1 at the first portion and the outside diameter of the inner shaft 1 at a boundary portion of the second portion, which is adjacent to the first portion, are smaller than the outside diameter of the inner shaft 1 at the second portion. In this case, the boundary portion has a second predetermined length in the axial direction, and the second predetermined length is generally approximately 3 to 4 mm. A difference between the outside diameter of the inner shaft 1 at the first portion and the outside diameter of the inner shaft 1 at the second portion excluding the boundary portion is generally in a range of 0.2 to 0.4 mm.

In step 2, the peripheral surface of the inner shaft 1 at the first portion is heat-treated. In step 3, the peripheral surface of the inner shaft 1 is finished by lathe turning.

In the invention, the method of performing heat treatment is not limited. Various methods of performing heat treatment on a component of the bearing device, for example, induction hardening, laser heat treatment, and carburizing may be employed.

What is claimed is:

1. A method of manufacturing a bearing device for a wheel, wherein the bearing device includes an inner ring member that includes an inner shaft and an inner ring constituent member fitted to a periphery of the inner shaft, an outer ring member that is disposed around a periphery of the inner ring member concentrically with the inner ring member, a rolling element that is rollably provided between the inner ring member and the outer ring member, and a wheel-mounting flange that protrudes outward, and that is formed on a peripheral surface of the inner shaft at a position close to an outer end portion of the inner shaft in a vehicle-width direction, the method comprising:

forming the inner shaft so that an outside diameter of the inner shaft at a first portion is smaller than the outside diameter of the inner shaft at a second portion which is adjacent to the first portion, and the first portion extends from an inner portion of a base of the wheel-mounting flange in the vehicle-width direction toward an inner end portion of the inner shaft in the vehicle-width direction, and the first portion has a predetermined length in an axial direction;

heat-treating the peripheral surface of the inner shaft at the first portion while the peripheral surface of the inner shaft at the second portion is not heat-treated; and finishing the peripheral surface of the inner shaft at the first portion and the second portion by lathe turning whereby a step is not formed at a border between the first portion and the second portion because the outside diameter of the inner shaft at the heat-treated first portion is smaller than the outside diameter of the inner shaft at the non-heat-treated second portion.

2. A method of manufacturing a bearing device for a wheel, wherein the bearing device includes an inner ring member that includes an inner shaft and an inner ring constituent member fitted to a periphery of the inner shaft, an outer ring member that is disposed around a periphery of the inner ring member concentrically with the inner ring member, a rolling element that is rollably provided between the inner ring member and the outer ring member, and a wheel-mounting flange that protrudes outward, and that is formed on a peripheral surface of the inner shaft at a position close to an outer end portion of the inner shaft in a vehicle-width direction, the method comprising:

forming the inner shaft so that an outside diameter of the inner shaft at a first portion and the outside diameter of the inner shaft at a boundary portion of a second portion, which is adjacent to the first portion, is smaller than the outside diameter of the inner shaft at the second portion excluding the boundary portion, the first portion extending from an inner portion of a base of the wheel-mounting flange in the vehicle-width direction toward an inner end portion of the inner shaft in the vehicle-width direction, and the first portion has a first predetermined length in an axial direction, and the boundary portion has a second predetermined length in the axial direction;

heat-treating the peripheral surface of the inner shaft at the first portion while the peripheral surface of the inner shaft at the second portion is not heat-treated; and finishing the peripheral surface of the inner shaft at the first portion and the second portion by lathe turning whereby a step is not formed at the boundary portion because the outside diameter of the heat-treated inner shaft at the first portion is smaller than the outside diameter of the inner shaft at the non-heat-treated second portion.

* * * * *